(12) United States Patent
Lienard et al.

(10) Patent No.: US 7,792,346 B2
(45) Date of Patent: Sep. 7, 2010

(54) METHOD AND APPARATUS FOR CORRECTION OF AN IMAGE

(75) Inventors: Jean Lienard, Igny (FR); Francisco Sureda, Chatenay Malabry (FR)

(73) Assignee: General Electric Company, Schenectady, NY (US)

( * ) Notice: Subject to any disclaimer, the term of this patent is extended or adjusted under 35 U.S.C. 154(b) by 1023 days.

(21) Appl. No.: 11/434,839

(22) Filed: May 16, 2006

(65) Prior Publication Data

US 2007/0036405 A1 Feb. 15, 2007

(30) Foreign Application Priority Data

May 16, 2005 (FR) .................................. 05 04893

(51) Int. Cl.
*G06K 9/00* (2006.01)
(52) U.S. Cl. ........................ 382/130; 382/128; 382/275
(58) Field of Classification Search ........................ None
See application file for complete search history.

(56) References Cited

U.S. PATENT DOCUMENTS

| | | | | | |
|---|---|---|---|---|---|
| 4,641,352 | A | * | 2/1987 | Fenster et al. | 382/130 |
| 5,048,103 | A | * | 9/1991 | Leclerc et al. | 382/294 |
| 5,644,613 | A | * | 7/1997 | Mick | 378/98.12 |
| 5,956,435 | A | * | 9/1999 | Buzug et al. | 382/283 |
| 5,982,915 | A | * | 11/1999 | Doi et al. | 382/130 |
| 6,208,419 | B1 | * | 3/2001 | Yamamoto et al. | 356/400 |
| 6,226,418 | B1 | * | 5/2001 | Miller et al. | 382/294 |
| 7,374,536 | B1 | * | 5/2008 | Taylor | 600/300 |
| 7,409,078 | B2 | * | 8/2008 | Pescatore et al. | 382/130 |
| 2003/0036751 | A1 | * | 2/2003 | Anderson et al. | 606/9 |
| 2004/0228511 | A1 | * | 11/2004 | Lienard et al. | 382/132 |
| 2005/0271302 | A1 | * | 12/2005 | Khamene et al. | 382/294 |
| 2007/0036405 | A1 | * | 2/2007 | Lienard et al. | 382/128 |

FOREIGN PATENT DOCUMENTS

| EP | 0 163 264 A | 12/1985 |
|---|---|---|
| WO | WO 94/18639 A | 8/1994 |

OTHER PUBLICATIONS

Meijering et al., "Retrospective motion correction in digital subtraction angiography: a review", IEEE Trans. Med. Imaging, v. 18, No. 1, Jan. 1999, pp. 2-21.

(Continued)

*Primary Examiner*—Yubin Hung
*Assistant Examiner*—Avinash Yentrapati
(74) *Attorney, Agent, or Firm*—Global Patent Operation

(57) ABSTRACT

A method and apparatus for automatically estimating a correction to be made to an image deformed with respect to a sequence of images. The method includes detecting of information pixels in the images; calculation of a region of interest located in a binary mapping image made from the images; for each image, search in the image, for the position of a mobile region that maximizes a similarity criterion to the region; and the estimated correction to be made to the image is compared with each image being the affine transformation of the mobile region moving from its found position at which similarity criterion is maximized to the region. The correction is only applied if the balance is equal to the improvement to the similarity criterion in the region of interest and the deterioration of the similarity criterion outside the region of interest is positive.

71 Claims, 5 Drawing Sheets

OTHER PUBLICATIONS

Cox et al., "Automatic registration of temporal image pairs for digital subtraction angiography", SPIE—Image Proc., v. 2167, 1994, pp. 188-189, sec. 1-7.

Gonzalez et al., "Digital Image Processing", 2002, pp. 602-607.

Roos et al., Reversible 3-D Decorrelation of Medical Images:, IEEE Trans. Med. Imaging, v. 12, No. 3, Sep. 1993, pp. 413-420.

Lundmark, "Non-overlapping Search Pattern for Logarithmic Search Motion Estimation", 3RD International Symposium on Video Processing and Multimedia Communications, 2001, sections 1-3.

Liu et al.,"Acceleration of EM Algorithm for Mixture Models Using ECME", Amer. Statistical Assoc. Proceedings of the Statistical Computing Section, 1999, pp. 109-114.

Dempster et al., "Maximum Likelihood for Incomplete Data via the EM Algorithm", J. Royal Statistical Soc., B39, pp. 1-38, 1977.

* cited by examiner

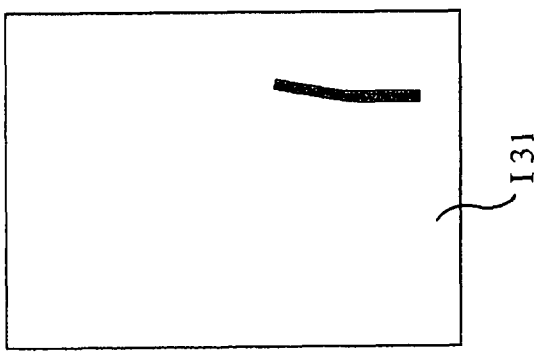
I31
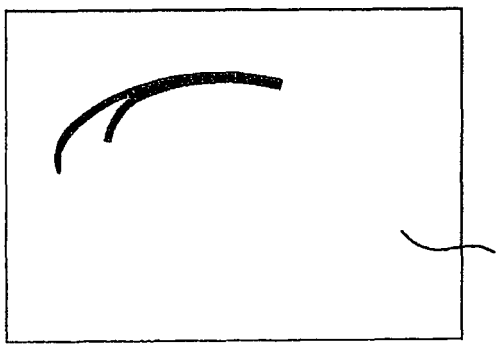
I32 FIG.2
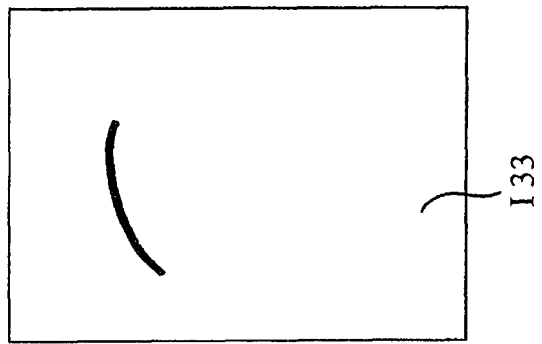
I33
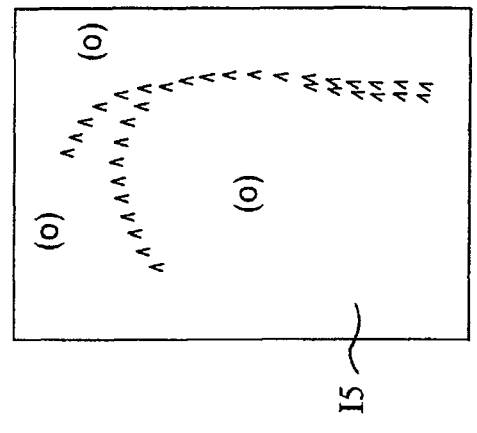
I5 FIG.4
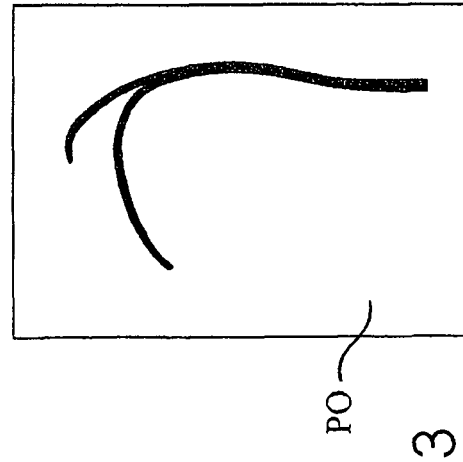
PO FIG.3

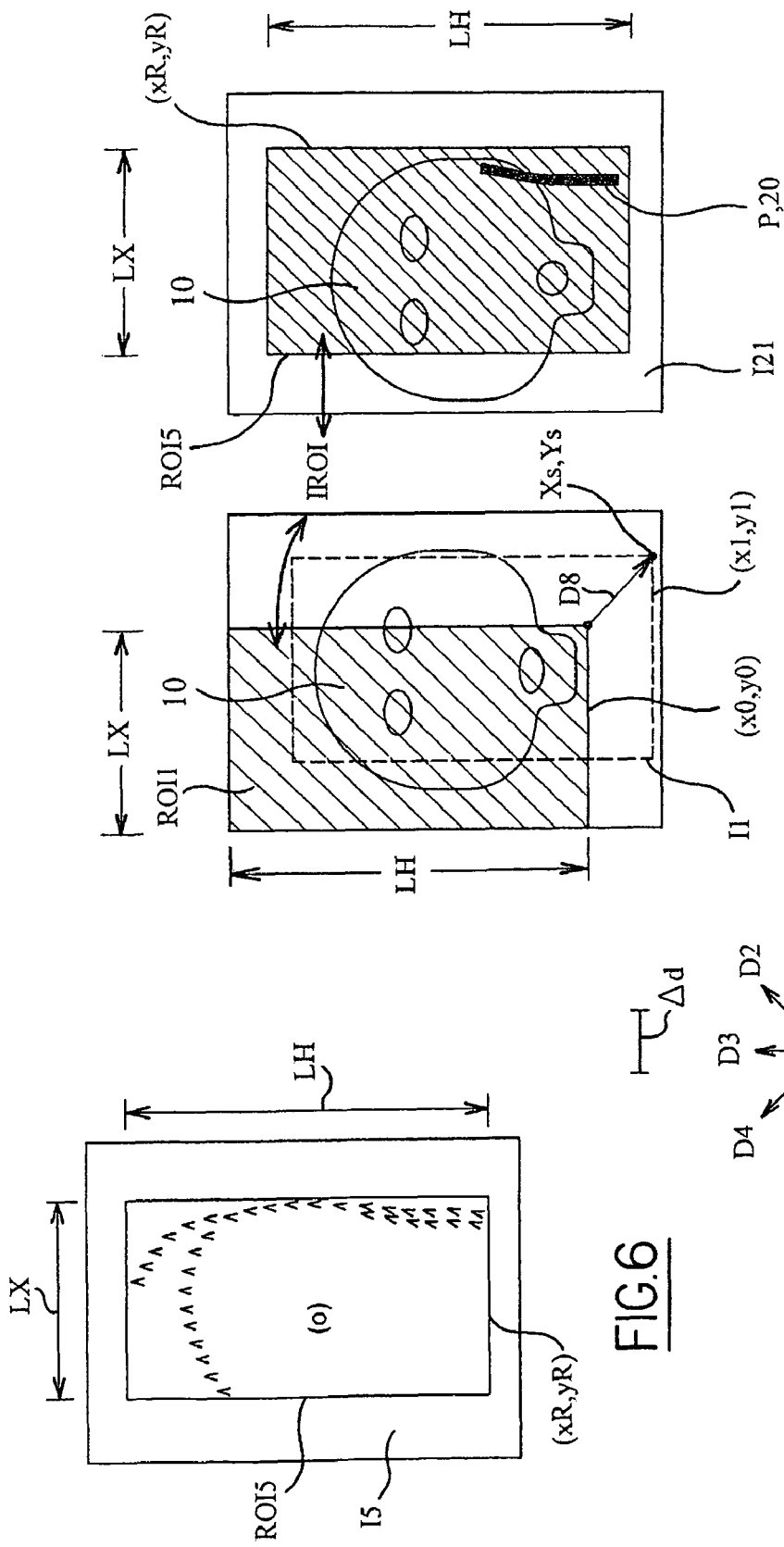

METHOD AND APPARATUS FOR CORRECTION OF AN IMAGE

CROSS-REFERENCE TO RELATED APPLICATIONS

This application claims the benefit of a priority under 35 USC 119 (a)-(d) to French Patent Application No. 05 04893 filed May 16, 2005 the entire contents of which is hereby incorporated by reference.

BACKGROUND OF THE INVENTION

An embodiment of the invention relates to a method and apparatus for correction of an image and in particular, the automatic estimating a correction to be made to a control image, deformed with respect to contrast images. One application field of the embodiment is medical imaging and it relates particularly to digital subtraction angiography (DSA).

Digital subtraction angiography is an image acquisition method using for example, a radiography apparatus emitting in particular X-rays, in which an attempt is made to represent the vascularization structures of the tissues of an object such as a patient. In angiography, vascular structures are demonstrated by comparing two images acquired with and without the injection of a contrast product into the patient's network of blood vessels. Point by point subtraction of the first control image called the "mask" obtained before the contrast product is injected, from the image obtained with the injected contrast product provides a means of obtaining an image of vascular structures alone.

A problem with the above method is due to the patient movement between one acquired image and the next. This movement may apply to all or some of the patient's body. The result is artifacts in the subtraction image that can modify the representation of vessels injected with the contrast product or mean that structures not injected with the contrast product are interpreted as blood vessels.

Thus, these artifacts not only degrade the quality of the subtraction image, but they may also mislead the radiologist with regard to the second image with the contrast product. In an attempt to eliminate subtraction artifacts, the radiologist can manually shift the mask image with respect to images taken with the contrast product, so as to make them correspond as much as possible before subtraction. However, manual shifting of the mask is usually done by trial and error and is a long interactive process that does not always produce an optimum result.

U.S. Pat. No. 5,048,103 describes a method of automatically resetting a mask image with respect to another contrast image in which a set of landmarks are selected and their shift is estimated between images so as to restore the mask image, the landmarks being selected as a function of how a combination of five magnitudes $X_1$, $X_2$, $X_3$, $X_4$ and $X_5$ can be satisfied, the combination having five coefficients $B_0$, $B_1$, $B_2$, $B_3$, $B_4$ and $B_5$ determined by a statistical analytical assessment on a population of images of the same type, for which the characteristics of restoration are already known. This method has the disadvantage not only of being complicated to use, but it also takes up a great deal of computer calculation time.

BRIEF DESCRIPTION OF THE INVENTION

An embodiment of the invention is intended to produce a method and an apparatus correction of am image and in particular for automatically estimating a correction that overcome the disadvantages of the state of the art and therefore enable an automatic and optimum shift of images with respect to each other to attenuate subtraction artifacts.

An embodiment of the invention is a method and apparatus for automatically estimating a correction to be made to a first mask digital image deformed with respect to a sequence of n second digital contrast images in which information (for example possibly a vascular opacification information) is represented by pixels with a lower or higher brightness level compared with the background. The embodiment of the method and apparatus comprises: detection of information pixels in the second n digital contrast images from which the first image was subtracted, to obtain a binary mapping image in which the information bits at a first determined level correspond to information pixels (for example possibly vascular opacification pixels) of at least one of the second images and for which the other level bits do not correspond to information pixels in the second images; calculation of the coordinates of a region of interest located in the binary mapping image and at least partly covering the information bits in this image; for each second contrast image, a search in the first mask image for the position of an affine mobile region of the region of interest that maximizes a similarity criterion calculated between the pixels in the region of interest fixed at its coordinates in the second contrast image and the pixels in the mobile region displaced by affine transformation in the first mask image; estimating a correction to be made to the first mask image compared with each second contrast image being the calculated shift affine transformation, making the mobile region move from its found position at which similarity criterion is maximized to the coordinates of the region of interest. An apparatus for DSA imaging is disclosed in US 2004/0228511 A1 for which the apparatus disclosed is hereby incorporated in its by reference.

BRIEF DESCRIPTION OF THE DRAWINGS

An embodiment of the invention will be better understood after reading the description given below simply as a non-limitative example with reference to the attached drawings in which:

FIGS. 2 to 4, 6, 7, 9 and 10 represent different intermediate images calculated as the method is carried out by an embodiment of the invention;

FIG. 8 shows an example of displacements made by a mobile region in an image of the sequence to maximize a similarity criterion to another image in the sequence.

DETAILED DESCRIPTION OF THE INVENTION

Figure 1:
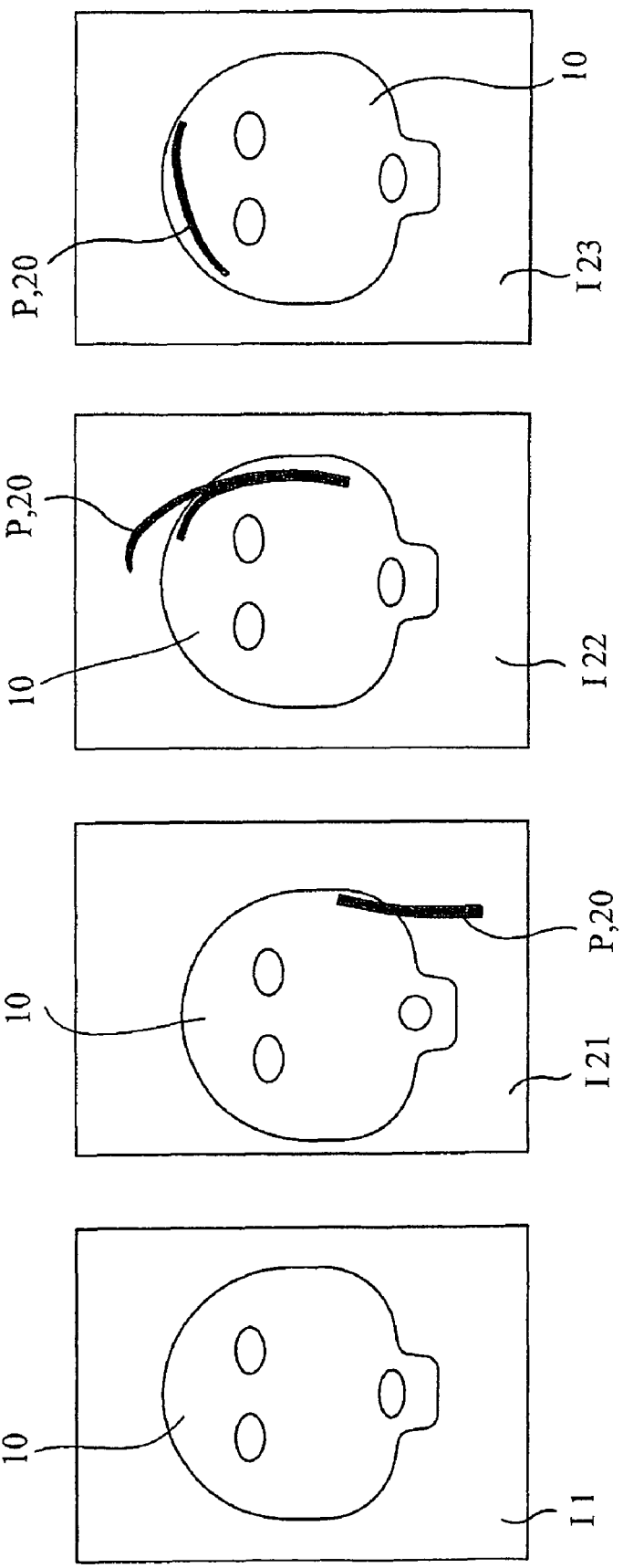
FIG. 1 shows a sequence of angiographic images provided by an embodiment of the method.

FIG. 1 shows an acquisition by any appropriate means, for example such as an X ray source, of a series of successive images of a part of the patient's body, which is for example the head in the following description but which could be any other part of the body, while a contrast product has been injected into the blood vessels of this part of the body by a catheter inserted inside the vessel in which the radiologist is interested. Obviously, the embodiment of the invention could also be applied to any other contrast detection images of an object.

FIG. 1 shows four successive images I1, I21, I22 and I23 showing the progress of the contrast product P, which is for example iodic, in the blood vessel network 20 of the part of the body of the patient under the action of blood circulation. Furthermore, the different images of the sequence have a set of so-called background structures 10 corresponding to all tissues of the part of the patient's body other than blood vessels. In the illustrative example in FIG. 1, only the bones 10 are illustrated among the set of background structures.

The acquired images I1, I21, I22, I23 are digital and each has a number of pixels defined by their abscissa x and their ordinate y and each has a brightness level also called the grey level, specific to them.

In angiography with an iodine contrast product, the pixels P of blood vessels containing the contrast product appear darker when the vessels are thicker, and darker than when these blood vessels do not contain any contrast product. The interesting information for the radiologist is the pixels 20 of vessels containing the contrast product, these pixels being called information pixels P, while the other pixels 10 are called background pixels.

In the following description, the image I1 acquired without a contrast product is called the first mask image or control, and the images I21, I22, I23 acquired successively with the injected contrast product are called second contrast images.

The method comprises detecting the position of a collimator in the acquired images I1, I21, I22, I23, and to subtract the collimator from the images. However, this is optional and it can be omitted when the images are acquired without a collimator. One or several specified collimator models are recorded in advance in a memory, to implement detection of the position of a collimator. Each collimator model is a virtual image S(x,y) where x and y represent the abscissa and the ordinate of pixels of the image. A collimator model is detected in an acquired image when a similarity criterion is a maximum between the pixels of this acquired image and the pixels of this collimator model. For example, this similarity criterion is the correlation between the acquired image I(x,y) and the collimator model S(x,y) calculated by the following equation:

$$C(K) = \sum_x \sum_y I(x, y) \cdot S_K(x, y)$$

where $S_K(x,y)$=collimator model in which K represents the displacement of the model along the x or y axis perpendicular to the edge of this collimator. The collimator contains black pixels on the acquired images, but the collimator may include low brightness pixels due to dispersions, radiological noise and diffusion. The acquired images generally have high brightness levels, while some anatomic structures, such as structures containing the contrast product, are darker.

Usually, a collimator has straight edges in peripheral parts of the image, for example forming a rectangle inside which the patient's body is displayed. For example, the collimator model $S_K(x,y)$ for a left vertical edge is:

$$S_K(x, y) = \begin{cases} -1 & 0 \leq x \leq K \\ +1 & K < x \leq \frac{N}{2} \end{cases} \quad 0 \leq y < N$$

where K is the column number defining the transition from black to white in the collimator at the left, and N is the size of the image.

The left edge of the collimator can be detected by maximizing the correlation between the left edge of the half-image I(x,y) where $$0 \leq x < \frac{N}{2}, 0 \leq y < N,$$

and the collimator model S(x,y) that divides the image into a black region represented by a value of the pixel equal to −1 and a white region represented by a value of the pixel equal to +1. The correlation is thus calculated as follows:

$$C(K) = \sum_{x=0}^{K} \sum_{y=0}^{N-1} I(x, y)(-1) + \sum_{x=K+1}^{N/2} \sum_{y=0}^{N-1} I(x, y)(+1) =$$

$$C(K) = \sum_{x=K+1}^{N/2} \sum_y I(x, y) - \sum_{x=0}^{K} \sum_y I(x, y)$$

$$C(K+1) = C(K) - 2\sum_y I(K, y)$$

where $$C(-1) = \sum_{x=0}^{N/2} \sum_{y=0}^{N-1} I(x, y).$$

This equation describes the recursive formula to determine the position K to the left of which the correlation is maximum. In addition, the explored left side (respectively the explored right side) of the image I(x,y) is averaged to zero by subtracting from it its average value determined on the left half side (respectively the right side) of the image, equal to $$\overline{I_L} = \sum_{x=0}^{N/2} \sum_{y=0}^{N-1} I(x, y),$$

before calculating the correlation value. Consequently, the initial value C (−1) is adjusted to zero.

The symmetric process is applied to determine the position of the collimator model at the right in the image, the average being calculated on the right half of the image, defined by the equation $$\frac{N}{2} \leq x < N, 0 \leq y < N.$$

The process may also be used to determine the position of the top and bottom collimator model in the images.

In the following, the first image I1 and the second images I21, I22, I23 are the images acquired directly or possibly obtained after subtraction from the acquired images I1, I21, I22, I23 the collimator model(s) that was (were) detected in the acquired images I1, I21, I22, I23 to remove the edge(s) of the image acquisition device collimator from them.

In a following subtraction, the first mask image I1 is subtracted from each second image I21, I22, I23, the subtraction being done between each pixel in the images. The result obtained is n=3 third images I31, I32, I33 equal to I21−I1, I22−I1 and I23−I1 respectively, as shown in FIG. 2. The third images I31, I32, I33 may have subtraction artifacts that are not shown in FIG. 2, considering the patient as a whole and therefore the entire head might have moved from one image of the sequence to the next in the example illustrated in the Figures, or the patient may have simply moved a part of the body such as the jaw in the example illustrated in the Figures.

During a maximum opacification, the pixels with the lowest brightness level are selected on the third images I31, I32, I33, for each position (x,y) of the pixels in these third images I31, I32, I33, to obtain a fourth mapping contrast image PO as shown in FIG. 3. For example, the image PO is firstly initialized with the contents of the first subtraction image I31. Then, while looping on all the other third images I32, I33, each pixel (x,y) in each third image I32, I33 is compared with the corresponding pixel (x,y) in the fourth current image PO. If the brightness level of the pixel considered in the third image I32, I33 is lower than the brightness of its equivalent on the fourth image PO, the pixel of image PO is replaced by this pixel of the third current image I32, I33. This operation is carried out for all pixels in all the third images I31, I32, I33 in sequence. Consequently, the result is areas which are opacified by the blood vessel contrast product and which are superposed in the fourth image PO.

The brightness level of the pixels in the fourth mapping image PO are then thresholded below a determined threshold value to obtain a fifth binary mapping image I5, in which pixels are formed from a bit with level 0 or 1. For example, bits equal to 1 correspond to the pixels in the mapping image PO for which the brightness level is lower than or equal to the threshold value, while the bits in the binary image equal to 0 correspond to pixels in the mapping image PO with a brightness level greater than this threshold value. FIG. 4 shows such an image I5 with bits equal to 1 and bits equal to 0, for the example of the image PO illustrated in FIG. 3. Consequently, bits equal to 1 are information bits about the position of blood vessels in the example described above.

The method is applicable to images for which the brightness level of information pixels is low compared with an adjacent background represented by pixels with a higher brightness level, and also to images in which the information pixels have a higher brightness level than an adjacent background represented by pixels with lower brightness level. For example, in the case of angiography with the $CO_2$ contrast product, information about the position of blood vessels is shown in the second images I21, I22, I23 by pixels with a high brightness level, and the background is represented by pixels with a lower brightness, for example by inversion of the brightness level in the images. In this case, the method is carried out in the reverse order, selecting pixels with the highest levels in the third images and thresholding them above a threshold value to obtain the binary image I5.

Figure 5:
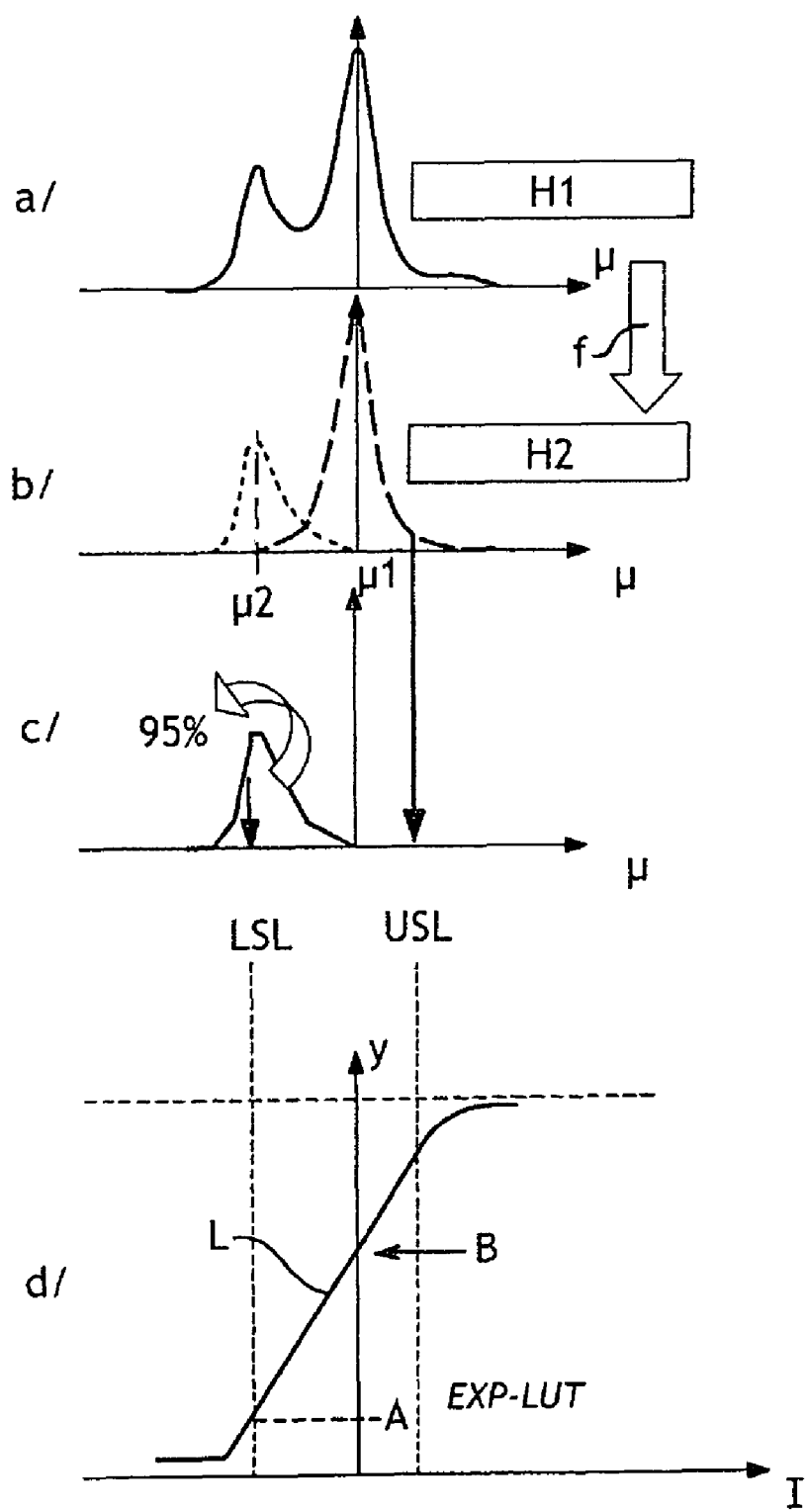
FIG. 5 diagrammatically shows histograms of an image to calculate a contrast improvement function.

For example, the threshold value used may be calculated as follows. For example, the threshold value is calculated using the histogram of the fourth contrast mapping image PO. FIG. 5 shows an example of such a histogram H1 for the distribution of brightness levels in the fourth contrast mapping image PO. For example, this distribution may be multimode and for example have two modes as shown in FIG. 5, in which the distribution of brightness levels comprises two main items of information: the information related to vessels through which the contrast product has passed, and information concerning the background and noise. Thereafter the method automatically determines the best match between a probability density function represented by the present histogram H1 and a function composed, for example, of a weighted sum of Gaussian distributions in the following form:

$$f(x) = \sum_k p_k \cdot N(m_k, \sigma_k)$$

where $p_k$ is the percentage of a Gaussian histogram of mode k having average $\mu_k$ and standard deviation $\sigma_k$. The determination of the best match mentioned above may be carried out using an deviation maximization (EM) approach as described by A. P. Dempster, N. M. Lairol and D. B. Rubin, "Maximum Likelihood for Incomplete Data via the EM algorithm", Journal of the Royal Statistical Society, B39, 1-38, 1977, and by C. Liu and D. X. Sun, "Acceleration of EM algorithm for Mixture Models using ECME", American Statistical Association Proceedings of the Statistical Computing Section, 109-114, 1997.

Therefore, a decomposition of the histogram H1 of the fourth contrast mapping image PO is made on a Gaussian base, to determine all triplets ($p_k$, $\mu_k$, $\sigma_k$) used to get the previously described best match, knowing that the sum of the coefficients $p_k$ is equal to one. The example illustrated in the Figures provides two triplets, that will characterize firstly noise for k=1, and secondly the contrast product for k=2 according to the histogram H2 in FIG. 5 or for k=2, ..., N more generally. In the iodine contrast example, $\mu_1$ is equal to approximately zero and $\mu_2$ is less than zero.

The method calculates the average global distribution of the contrast from the equation $$g(x) = \frac{\sum_{k \neq noise} p_k \cdot N(m_k \cdot \sigma_k)}{\sum_{k \neq noise} p_k},$$

and the average value $\mu_g$ and the standard deviation $\sigma_g$ of this distribution g(x) are calculated, noise being represented by the index k=1 in this formula. Thus, the average global distribution g(x) is determined by subtracting the component $p_1 \cdot N(\mu_1, \sigma_1)$ of the noise in the histogram H2=f(x). The threshold value is calculated as being greater than the average $\mu_g$ of the average global distribution g(x) of the contrast in the fourth mapping contrast image PO. For example, this threshold value may be equal to $\mu_g + \sigma_g$.

At the same time, a conversion function called the expansion improvement (EXP-LUT) function can be determined, to improve the brightness and/or the contrast of the second images I21, I22, I23. This improvement function may be applied to the series of second images I21, I22, I23 from which the first image I1 was subtracted in the correction that will be described below, and to be displayed.

The improvement function may for example be calculated using two values called the upper specification limit USL (upper brightness threshold) and the lower specification limit LSL (lower brightness threshold). The value LSL may be determined at the point at which the cumulative distribution function of the contrast product reaches 5% (in other words more than 95% of the values are beyond this point) as illustrated in FIG. 5c, in other words LSL=$\mu_2$−(1.647×$\sigma_2$). Similarly, the value USL may be determined at the point at which the cumulative distribution function of the noise becomes greater than 95% (in other words only 5% of the values are beyond this point), which means that USL=$\mu_1$+(1.645×$\sigma_1$). Thus, the smallest value and the largest value respectively of the conversion function EXP-LUT is obtained. A conversion function of this type is illustrated in FIG. 5d and is in the form of a curve with a linear part L for which the bottom and top parts are shown by the values LSL and USL. The position of the curve EXP-LUT along the y-axis may be obtained by fixing the output value of the zero input level (point B) that determines the global brightness of the image to be displayed. The improvement function is described in US 2004/0228511 A1 and which is incorporated by reference.

The lower threshold LSL of the linear part L of the improvement function EXP-LUT may also be calculated as follows: LSL=$\mu_g$–Z.$\sigma_g$, where Z may be previously adjusted to between three and four depending on the user's preferences, Z=4 providing a natural appearance, and Z=3 corresponding to highly contrasted images.

A region of interest ROI5 in the fifth binary mapping image I5 obtained is determined during a calculation, as shown in FIG. 6. The region of interest ROI5 is calculated as partly or fully covering the information bits in the binary image I5, in other words in the above example, the 1 bits. For example, the region of interest ROI5 is calculated by its coordinates xR, yR in the binary mapping image I5. For example, the required shape for the region of interest ROI5 is specified, for example it may be rectangular and parallel to the straight edges of the binary image I5 along the x and y axes. The coordinates of the region of interest ROI5 may be calculated, for example, by the coordinates of its corners. The information bits are used to calculate the coordinates of the center of gravity of the region of interest ROI5, such that it contains a majority of information bits. The dimension of the sides of the region ROI5 are then calculated from the coordinates xR, yR. The information bits of the binary image I5 may be considered as being a mass distribution for which the center of gravity and the moments of inertia with respect to the x axis and the y axis provide the coordinates of the center and the length of the sides of the rectangular region ROI5 covering the information bits.

In a comparison, a mobile region ROI1 is defined in the first image I1 with the same dimensions as the previously calculated region of interest ROI5, in other words in the example illustrated in FIG. 7, the same width LX along the x axis and the same height LH along the y axis. The comparison is described in the following embodiment for correction of the second image I21 in FIG. 7 using a rigid translation affine transformation. In this case, the mobile region ROI1 keeps the same dimensions as the region of interest ROI5 during translations of this mobile region ROI1. This would also be the case with displacements by rotation of the mobile region ROI1. If the affine transformation displacement of the mobile region ROI1 involves one or several homothetic transformations, the mobile region ROI1 may then have the same dimensions as the region of interest ROI5 before displacement, and then the dimensions can be changed after displacement. Obviously, the procedure is the same for all of the second images.

A similarity criterion IROI between the pixels located in the mobile region ROI1 of the first image I1 and the pixels located in the region of interest ROI5 fixed in the second image I21 for which the coordinates xR, yR have being previously calculated, is calculated for each position of the mobile region IROI1 in the first image I1. For example, one similarity criterion IROI is the intercorrelation between the mobile region ROI1 and the region of interest ROI5 that passes through a maximum when the pixels in the two regions are identical or similar in terms of brightness levels.

The similarity criterion IROI may also be mutual information between the mobile region ROI1 and the region of interest ROI5, defined by equations:

$$I = H(X) + H(Y) - H(XY)$$

where $$H(X) = \sum_X p(X)\log(p(X))$$

and $$H(Y) = \sum_Y p(Y)\log(p(Y))$$

and $$H(XY) = \sum_{X,Y} p(XY)\log(p(XY)),$$

where X is the mobile region ROI1 in the first image I1, Y is the region of interest ROI5 in the second image, p(X) denotes the brightness levels histogram for the mobile region ROI1 in the first image I1, p(Y) denotes the brightness levels histogram for the region of interest ROI5 in the second image I21, and p(XY) denotes the joint histogram of the brightness levels for the mobile region ROI1 in the first image I1, and of the brightness levels for the region of interest ROI5 in the second image I21. The mutual information I pass through a maximum when the position of the structures in the mobile region ROI2 are very similar to the position of the structures in the region of interest ROI5.

In the case of the similarity criterion IROI calculated by intercorrelation between ROI1 and ROI5, the pixels that correspond, in the region of interest ROI5 of the second image I21, to the information bits of the binary mapping image I5, are replaced by bits with the other level, in other words by bits with level 0 in the example illustrated in the Figures. By definition, information pixels like those defined above are missing from the first image I1 and therefore care is taken such that the similarity by intercorrelation criterion IROI is calculated on two regions ROI5 and ROI1 as less dissimilar as possible.

In the case of the similarity criterion IROI by calculation of mutual information between ROI1 and ROI5, the pixels of the region of interest ROI5 in the second image I21 corresponding to information bits in the binary mapping image I5, are replaced by noise.

The search for the position of the mobile region ROI1 in the first image I1, maximizing the similarity criterion IROI to the region of interest ROI5 in the second image I21, is for example done by successive displacements of this mobile region ROI1 in the first image I1 from a determined initial position x0, y0.

The similarity criterion IROI between the mobile region ROI1 initialized at position x0, y0 (shown cross-hatched in FIG. 7) in the first image I1 and the region of interest ROI5 fixed at xR, yR (shown cross-hatched in FIG. 7) in the second image I21, is calculated.

The method tests the value of the similarity criterion IROI for the mobile region ROI1 displaced by a specified increment Δd in several intersecting directions of the first image I1 from the initial position x0, y0. For example, these displacements in FIG. 8 consist of a first horizontal displacement D1 of Δd towards the right, a second diagonal displacement D2 of Δd towards the right and Δd upwards, a third vertical displacement D3 of Δd upwards, a fourth diagonal displacement D4 of Δd upwards and Δd towards the left, a fifth horizontal displacement D5 of Δd towards the left, a sixth diagonal displacement D6 of Δd towards the left and Δd downwards, a seventh vertical displacement D7 of Δd downwards and an eighth diagonal displacement D8 of Δd towards the right and Δd downwards. For example, the increment Δd may be chosen to be equal to an integer number of pixels, for example a power of two equal to $2^m$, less than or equal to the maximum half-dimension of the required displacement.

Therefore, eight values of the similarity criterion IROI are calculated for the eight displacements D1 to D8, for the mobile region ROI1 that was displaced along these displacements D1 to D8.

Among the displacements D1 to D8, the displacement which is selected is the one maximizing the similarity criterion IROI between the region ROI1 displaced by these displacements in the image I1 and the region of interest ROI5 fixed at xR, yR in the second image I21. For example, the selected displacement is the displacement D8 in FIG. 7. The mobile region ROI1 is then displaced by this displacement D8 selected in the image I1 from the initial position x0, y0 to arrive at the new position x1, y1 of the mobile region ROI1 in the first image I1 shown in dashed lines in FIG. 7.

The process is then iterated in FIG. 8 with a new displacement increment less than the first, and for example divided by two compared with the first, to select a new displacement of the mobile region ROI1 starting from the previously calculated position x1, y1. In each subsequent iteration, it is checked that the similarity criterion IROI for the selected displacement is greater than or equal to the similarity criterion IROI calculated for the previous displacement, in order to guarantee convergence.

Figure 9:
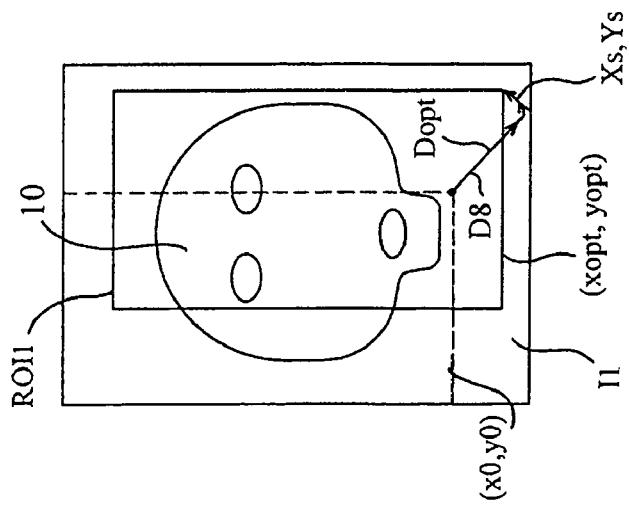

When the increment becomes smaller than a pixel, a fractional part of the displacement is calculated. This fractional displacement may for example be found by approximation of a position interpolated by a quadric in the form $T(x,y)=Ax^2+By^2+Cxy+Dx+Ey+F$. The function T is known for x and y with integer values of pixels. By selecting a given neighborhood, for example eight points in integer pixel coordinates around the point obtained during the last displacement, nine equations are obtained for only six unknowns: the six parameters A to F. A least squares regression is made to approximate the values of the six parameters A to F, and the maximum of the quadric is determined at the coordinates $X_S, Y_S$ given by the following equations: $X_S=(-2BD+CE)/(4AB-C^2)$ and $Y_S=(-2AE+CD)/(4AB-C^2)$ In FIG. 9, the ROI1 with respect to the initial position x0, y0 (shown in dashed lines) in the first image I1 is then equal to the sum of the displacements selected during the process, in other words the sum of the selected integer displacements (including D8 in the previous example) and the calculated fractional displacement $X_S, Y_S$, these displacements being shown by arrows in FIG. 8. The coordinates (xopt, yopt) of the mobile region ROI1 displaced by this displacement Dopt in the first image I1 are then calculated, these coordinates (xopt, yopt) therefore corresponding to the position of the mobile region ROI1 in the first image I1, maximizing the similarity criterion IROI to the region of interest ROI5 in the second image I21.

The method calculates for the second image I21 the correction (xCor, yCor) to be made to the first image I1 as a shift, uniform for the entire first image I1 in the case of a displacement by translation, and equal to the displacement of the mobile region ROI1 going from its position (xopt, yopt) maximizing the similarity criterion IROI to the coordinates (xR, yR) of the region of interest ROI5, in other words an affine shift transformation (xCor, yCor) which in the above example is formally equal to the vector (xopt, yopt)→(xR, yR):xCor=xR−xopt, and YCor=yR−yopt. The calculated value of this shift (xCor, yCor) gives an estimate of the optimum displacement of the first image I1 with respect to the second image I21, and is intended to be applied to this entire first image I1 to subtract the image I1 thus displaced by the shift (xCor, yCor) from this second image I21 during the correction step of this second image I21.

Figure 10:
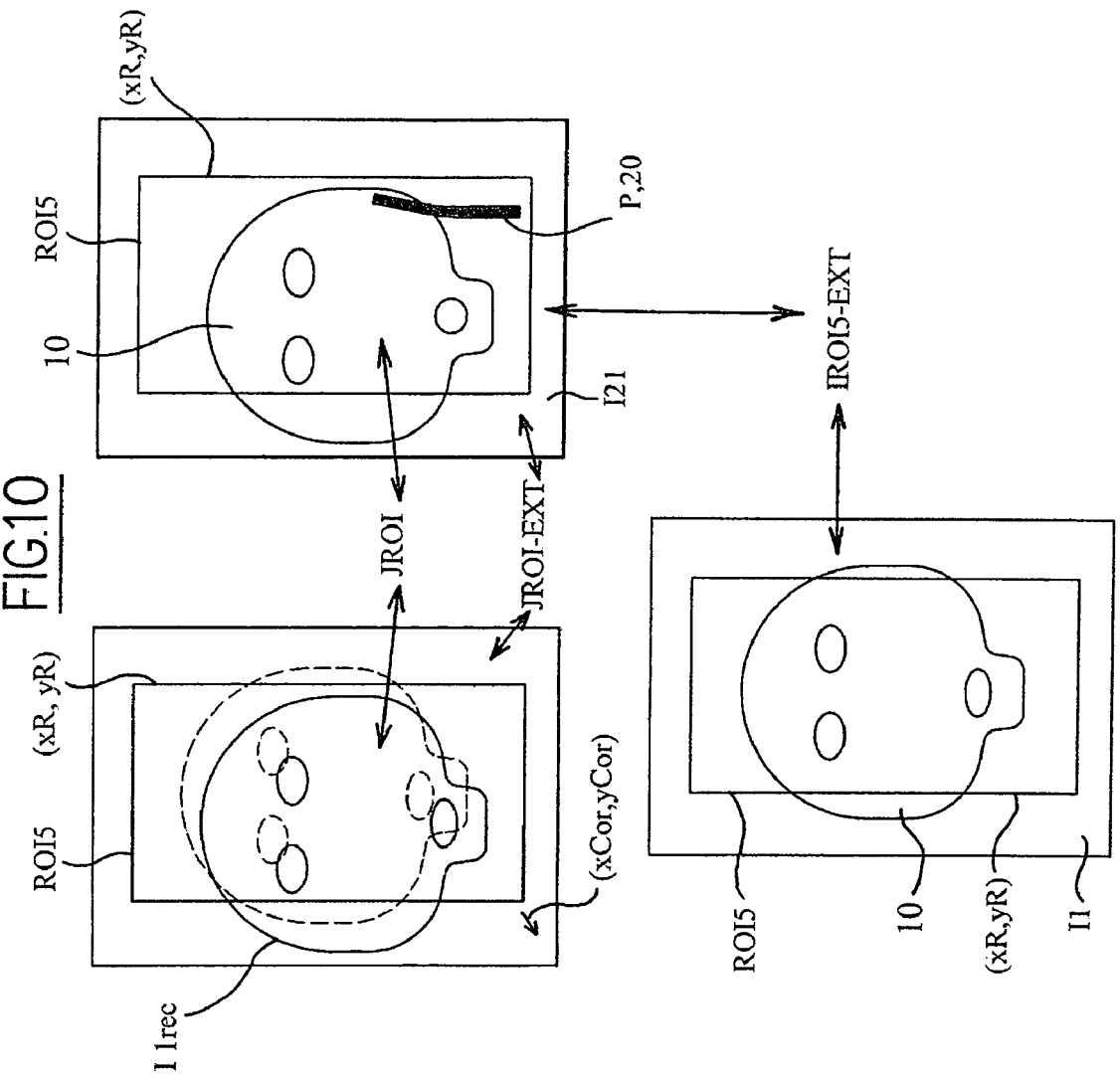

In one embodiment, the optimum shift (xCor, yCor) calculated from the first image I1 for the second image I21 is directly applied to this first image I1 during the correction step, to obtain a first shifted image I1rec shown in solid lines in FIG. 10, in which the first unshifted image I1 is shown in broken lines. The first image I1rec displaced by this optimum shift (xCor, yCor) is subtracted from the second image I21.

In another embodiment, the correction is only applied if the balance=improvement to the similarity criterion in the region of interest+deterioration of the similarity criterion outside the region of interest is positive. The value of a similarity criterion between the first image I1rec shifted by the optimum shift (xCor, yCor) calculated above and the second image I21, is examined. More precisely, the value of the similarity criterion JROI between the pixels of the region of interest ROI5 fixed at its coordinates xR, yR in the first shifted image I1rec, and the pixels of this region of interest ROI5 in the second image I21, is calculated. The value of a first external similarity criterion JROI-EXT between the pixels of the first shifted image I1rec located outside the region of interest ROI5 in this first shifted image I1rec, and the pixels of the second image I21 located outside the region of interest ROI5, is also calculated. The similarity criterion JROI of the first shifted image I1rec is therefore greater than the similarity criterion IROI calculated between the mobile region ROI1 not displaced by the optimum displacement Dopt in the first image I1 and the region of interest ROI5 in the second image I21.

The value of the first external similarity criterion JROI-EXT is compared with the value of the second external similarity criterion IROI5-EXT calculated between the pixels located in the first undisplaced image I1 outside the region of interest ROI5 fixed at its coordinates xR, yR, and the pixels of the second image I21 located outside this same region of interest ROI5. If the test shows that the first external criterion JROI-EXT is less than the second external criterion IROI5-EXT, which corresponds to the fact that the mask image I1rec shifted by (xCor, yCor) is more degraded outside the region of interest ROI5 than it was before the shift (xCor, yCor), the correction (xCor, yCor) is not applied to the first image I1 and the subtraction is made between the second image I21 and the first undisplaced image I1.

On the other hand, if the first external criterion JROI-EXT is greater than or equal to the second external criterion IROI5-EXT, the displacement of the first image I1 is made with the previously calculated shift (xCor, yCor) and the subtraction is made between the second image I21 and this first shifted image I1rec.

As a variant, the optimum displacement Dopt of the mobile region ROI1 is calculated with each of the two similarity criteria IROI indicated above and the displacement Dopt providing the best reduction of artifacts is selected, as measured by an improvement in the mutual global and local information JROI-EXT and JROI.

In other embodiments, the search for the optimum position (xopt, yopt) of the mobile region ROI5 maximizing the similarity criterion to the region of interest ROI1, may be made in addition to or by replacing the translations Δd, by including successive rotation increment Δθ or successive homothetic increments Δα (magnification or reduction) in the optimum displacement Dopt, these increments being iterated in a manner analogous to that described for the previous embodiments. In this case, the correction (xCor, yCor) is a shift affine transform (xCor, yCor) comprising at least one rotation and/or at least one homothetic transformation and/or at least one translation.

The expansion improvement function (EXP-LUT) can then be applied to the image I21 from which the image I1rec or I1 was or was not subtracted.

An embodiment of the invention thus provides a means of satisfactorily adjusting the first mask image on each contrast detection image when it is decided to move the first mask image, without showing deformations due to different shifts of the landmarks that are taken into account in U.S. Pat. No. 5,048,103, on the mask image. In U.S. Pat. No. 5,048,103, the different deformations applied to the different parts of the images show disturbing discontinuities in the rendered subtraction image. On the other hand, when it is decided to move the first mask image, the embodiment of the present invention can be used to make an automatic and optimum shift of the first image on each second image, which gives a much faster subtraction image than can be obtained with a manual shift or by an automatic shift as described in U.S. Pat. No. 5,048,103.

The calculated correction may be any affine deformation including one or several translation(s), one or several rotation(s), one or several homothetic transformations or combination of these transformations.

The embodiments of the invention can include one or more of the following characteristics: (1) a search for the position of the mobile region in the first mask image for each second contrast image is done by searching in the first mask image for the position of the mobile region with the same dimensions as the region of interest, that maximizes a similarity criterion calculated between the pixels in the region of interest fixed at its coordinates in the second contrast image and the pixels in the mobile region moved in the first mask image; (2) the estimated correction to be made to the first mask image compared with each second contrast image being a calculated shift equal to the displacement of the mobile region from its found position maximizing the similarity criterion to the coordinates of the region of interest; (3) detection of information pixels in the n second digital contrast images comprises subtracting pixels in the first mask image from pixels in the n second digital contrast images, to obtain a plurality of n third images and selecting pixels with the lowest or the highest brightness level among the pixels in the n third images obtained, to obtain a fourth contrast mapping image and thresholding of the brightness level of the pixels in the fourth contrast mapping image, respectively below or above a given threshold value to obtain the binary mapping image; (4) the distribution of brightness levels of the pixels in the fourth contrast mapping image is decomposed into a linear combination of Gaussians, from which the Gaussian component, corresponding to noise centered on the uniform background equal to zero is subtracted, to calculate the global average distribution of the contrast on the remaining components; (5) the threshold value being calculated as being greater than the average of this global average distribution of the contrast; (6) the threshold value is calculated as being equal to the sum of the average and the standard deviation of the global average distribution of the contrast; (7) a level brightness conversion function valid between a lower brightness level threshold and an upper brightness level threshold is applied to the second corrected digital contrast images; (8) the lower brightness level threshold is calculated equal to $\mu_g - Z.\sigma_g$ where $3 \leq Z \leq 4$, or respectively the upper brightness level threshold is calculated equal to $\mu_g + Z.\sigma_g$ where $3 \leq Z \leq 4$, where $\mu_g$ is the average of the global average contrast distribution, and $\sigma_g$ is the standard deviation of the global average contrast distribution; (9) detection of the information pixels in the n second digital contrast images is executed on the set of the first image and the second images, from which a specified collimator model has been subtracted, when such a specified collimator model has been detected during a previous step to detect the positioning of at least one specified collimator model in the first image and the second images; (10) for each second digital contrast image, the calculated shift affine transformation is applied to all pixels in the first image to obtain a first shifted image that is subtracted from the second digital contrast image to obtain a second corrected image; (11) or, for each second digital contrast image, the value of a first similarity criterion is calculated between the pixels in the first image transformed by the calculated shift affine transformation that are located outside the region of interest in this first transformed image, and the pixels in the second digital contrast image that are located outside the region of interest; (12) the value of a second similarity criterion is calculated between the pixels in the first image that are outside the region of interest in this first image, and the pixels in the second digital contrast image that are outside the region of interest; (13) and the first image transformed as a whole by the calculated shift affine transformation is subtracted from the second digital contrast image, to obtain a second corrected image, if the first calculated similarity criterion is greater than or equal to the second calculated similarity criterion, and the first image is subtracted from the second digital contrast image to obtain a second corrected image, if the first calculated similarity criterion is less than the second calculated similarity criterion; (14) the similarity criterion is the intercorrelation or the mutual information; (15) the similarity criterion includes the intercorrelation calculated between the pixels in the mobile region displaced by affine transformation in the first mask image and the pixels located in the region of interest fixed at its coordinates in the second contrast image, among which the pixels corresponding to the information bits of the binary mapping image are set to zero; (16) or the similarity criterion includes mutual information calculated between the pixels in the mobile region displaced by affine transformation in the first mask image and the pixels located in the region of interest fixed at its coordinates in the second contrast image, among which the pixels corresponding to the information bits of the binary mapping image are replaced by noise.

In addition, while an embodiment of the invention has been described with reference to exemplary embodiments, it will be understood by those skilled in the art that various changes may be made in the function and/or way and/or result and equivalents may be substituted for elements thereof without departing from the scope and extent of the invention. In addition, many modifications may be made to adapt a particular situation or material to the teachings of the invention without departing from the essential scope thereof. Therefore, it is intended that the invention not be limited to a particular embodiment disclosed for carrying out this invention, but that the invention will include all embodiments falling within the scope of the appended claims. Moreover, the use of the terms first, second, etc. or steps do not denote any order or importance, but rather the terms first, second, etc. or steps are used to distinguish one element or feature from another. Furthermore, the use of the terms a, an, etc. do not denote a limitation of quantity, but rather denote the presence of at least one of the referenced element or feature.

What is claimed is:

1. A method for correcting an image comprising:
   providing a first mask digital image deformed with respect to a sequence of second digital contrast images in which information is represented by pixels with a lower or higher brightness level compared with a background;

detecting the information pixels in the second digital contrast images from which the first mask digital image was subtracted to obtain a binary mapping image, wherein the binary mapping image has information bits at a first determined level that correspond to information pixels of at least one of the second digital contrast images and other information bits at levels that do not correspond to information pixels in the second digital contrast images;

calculating coordinates of a region of interest having dimensions at least partly covering the information bits in the binary mapping image;

searching, for each second digital contrast image, in the first mask digital image for the position of a mobile region, wherein the position of the mobile region maximizes a similarity criterion calculated between the pixels in the region of interest fixed at coordinates in the second digital contrast image and the pixels in the mobile region displaced by shift affine transformation in the first mask digital image;

estimating, for each second digital contrast image, the correction to be made to the first mask digital image compared with each second digital contrast image, wherein the correction is the calculated shift affine transformation that makes the mobile region move from its found position at which the similarity criterion is maximized to the coordinates of the region of interest, calculating, for each second digital contrast image, a first value and a second value of the similarity criterion; and obtaining a second corrected image, wherein the first value is calculated between the pixels located in the region of interest in the first mask digital image transformed by the calculated shift affine transformation and the pixels located in the region of interest in the second digital contrast image, wherein the second value is calculated between the pixels located outside the region of interest in the first mask digital image transformed by the calculated shift affine transformation and the pixels located outside the region of interest in the second digital contrast image, wherein, if the first value is greater than or equal to the second value, the first mask digital image transformed by the calculated shift affine transformation is subtracted from the second digital contrast image to obtain the second corrected image, and wherein, if the first value is less than the second value, the first mask digital image is subtracted from the second digital contrast image to obtain the second corrected image.

2. The method according to claim 1 wherein:

the position of the mobile region has the same dimensions as the region of interest, wherein the position maximizes the similarity criterion in which the similarity criterion is calculated between the pixels in the region of interest fixed at its coordinates in the second digital contrast image and the pixels in the mobile region moved in the first mask digital image, and wherein the estimated correction to be made to the first mask digital image compared with each second digital contrast image is a calculated shift equal to the displacement of the mobile region from its found position maximizing the similarity criterion to the coordinates of the region of interest.

3. The method according to claim 1 further comprising:

subtracting pixels in the first mask digital image from pixels in the second digital contrast images, to obtain a plurality of third images;

selecting pixels with the lowest or the highest brightness level among the pixels in the third images, to obtain a fourth contrast mapping image; and thresholding of the brightness level of the pixels in the fourth contrast mapping image below or above a threshold value to obtain the binary mapping image.

4. The method according to claim 2 further comprising:

subtracting pixels in the first mask digital image from pixels in the second digital contrast images, to obtain a plurality of third images;

selecting pixels with the lowest or the highest brightness level among the pixels in the third images, to obtain a fourth contrast mapping image; and thresholding of the brightness level of the pixels in the fourth contrast mapping image below or above a threshold value to obtain the binary mapping image.

5. The method according to claim 3 wherein the distribution of brightness levels of the pixels in the fourth contrast mapping image is decomposed into a linear combination of Gaussians, from which the Gaussian component corresponding to noise centered on the uniform background equal to zero is subtracted, to calculate the global average distribution of the contrast on the remaining components; and the threshold value being calculated as being greater than the average of this global average distribution of the contrast.

6. The method according to claim 4 wherein the distribution of brightness levels of the pixels in the fourth contrast mapping image is decomposed into a linear combination of Gaussians, from which the Gaussian component corresponding to noise centered on the uniform background equal to zero is subtracted, to calculate the global average distribution of the contrast on the remaining components; and the threshold value being calculated as being greater than the average of this global average distribution of the contrast.

7. The method according to claim 5 wherein the threshold value is calculated as the sum of the average and the standard deviation of the global average distribution of the contrast.

8. The method according to claim 6 wherein the threshold value is calculated as the sum of the average and the standard deviation of the global average distribution of the contrast.

9. The method according to claim 5 further comprising applying a level brightness conversion function to the second corrected digital contrast images, wherein the level brightness conversion function is valid between the lower brightness level threshold and the upper brightness level threshold.

10. The method according to claim 8 further comprising applying a level brightness conversion function to the second corrected digital contrast images, wherein the level brightness conversion function is valid between the lower brightness level threshold and the upper brightness level threshold.

11. The method according to claim 9 wherein the lower brightness level threshold is calculated equal to $\mu_g - Z.\sigma_g$ where $3 \leq Z \leq 4$, or respectively the upper brightness level threshold is calculated equal to $\mu_{g+Z.\sigma g}$ where $3 \leq Z \leq 4$, where $\mu_g$ is the average of the global average contrast distribution (g(x)), and $\sigma_g$ is the standard deviation of the global average contrast distribution (g(x)).

12. The method according to claim 10 wherein the lower brightness level threshold is calculated equal to $\mu_{g-Z.\sigma g}$ where $3 \leq Z \leq 4$, or respectively the upper brightness level threshold is calculated equal to $\mu_g + Z.\sigma_g$ where $3 \leq Z \leq 4$, where $\mu_g$ is the average of the global average contrast distribution (g(x)), and $\sigma_g$ is the standard deviation of the global average contrast distribution (g(x)).

13. The method according to claim 1 wherein the detection of information pixels in the second digital contrast images is executed on the first mask digital image and the second digital contrast images from which a specified collimator model has been subtracted, wherein the specified collimator model has been detected during a previous step to detect the positioning of at least one specified collimator model in the first mask digital image and the second digital contrast images.

14. The method according to claim 2 wherein the detection of information pixels in the second digital contrast images is executed on the first mask digital image and the second digital contrast images from which a specified collimator model has been subtracted, wherein the specified collimator model has been detected during a previous step to detect the positioning of at least one specified collimator model in the first mask digital image and the second digital contrast images.

15. The method according to claim 3 wherein the detection of information pixels in the second digital contrast images is executed on the first mask digital image and the second digital contrast images from which a specified collimator model has been subtracted, wherein the specified collimator model has been detected during a previous step to detect the positioning of at least one specified collimator model in the first mask digital image and the second digital contrast images.

16. The method according to claim 5 wherein the detection of information pixels in the second digital contrast images is executed on the first mask digital image and the second digital contrast images from which a specified collimator model has been subtracted, wherein the specified collimator model has been detected during a previous step to detect the positioning of at least one specified collimator model in the first mask digital image and the second digital contrast images.

17. The method according to claim 7 wherein the detection of information pixels in the second digital contrast images is executed on the first mask digital image and the second digital contrast images from which a specified collimator model has been subtracted, wherein the specified collimator model has been detected during a previous step to detect the positioning of at least one specified collimator model in the first mask digital image and the second digital contrast images.

18. The method according to claim 9 wherein the detection of information pixels in the second digital contrast images is executed on the first mask digital image and the second digital contrast images from which a specified collimator model has been subtracted, wherein the specified collimator model has been detected during a previous step to detect the positioning of at least one specified collimator model in the first mask digital image and the second digital contrast images.

19. The method according to claim 11 wherein the detection of information pixels in the second digital contrast images is executed on the first mask digital image and the second digital contrast images from which a specified collimator model has been subtracted, wherein the specified collimator model has been detected during a previous step to detect the positioning of at least one specified collimator model in the first mask digital image and the second digital contrast images.

20. The method according to claim 1 wherein for each second digital contrast image, the calculated shift affine transformation is applied to all pixels in the first mask digital image to obtain a first shifted image, and wherein the first shifted image is subtracted from the second digital contrast image to obtain the second corrected image.

21. The method according to claim 2 wherein for each second digital contrast image, the calculated shift affine transformation is applied to all pixels in the first mask digital image to obtain a first shifted image, and wherein the first shifted image is subtracted from the second digital contrast image to obtain the second corrected image.

22. The method according to claim 3 wherein for each second digital contrast image, the calculated shift affine transformation is applied to all pixels in the first mask digital image to obtain a first shifted image, and wherein the first shifted image is subtracted from the second digital contrast image to obtain the second corrected image.

23. The method according to claim 5 wherein for each second digital contrast image, the calculated shift affine transformation is applied to all pixels in the first mask digital image to obtain a first shifted image, and wherein the first shifted image is subtracted from the second digital contrast image to obtain the second corrected image.

24. The method according to claim 7 wherein for each second digital contrast image, the calculated shift affine transformation is applied to all pixels in the first mask digital image to obtain a first shifted image, and wherein the first shifted image is subtracted from the second digital contrast image to obtain the second corrected image.

25. The method according to claim 9 wherein for each second digital contrast image, the calculated shift affine transformation is applied to all pixels in the first mask digital image to obtain a first shifted image, and wherein the first shifted image is subtracted from the second digital contrast image to obtain the second corrected image.

26. The method according to claim 11 wherein for each second digital contrast image, the calculated shift affine transformation is applied to all pixels in the first mask digital image to obtain a first shifted image, and wherein the first shifted image is subtracted from the second digital contrast image to obtain the second corrected image.

27. The method according to claim 13 wherein for each second digital contrast image, the calculated shift affine transformation is applied to all pixels in the first mask digital image to obtain a first shifted image, and wherein the first shifted image is subtracted from the second digital contrast image to obtain the second corrected image.

28. The method according to claim 1 wherein the similarity criterion is the intercorrelation or the mutual information.

29. The method according to claim 2 wherein the similarity criterion is the intercorrelation or the mutual information.

30. The method according to claim 3 wherein the similarity criterion is the intercorrelation or the mutual information.

31. The method according to claim 5 wherein the similarity criterion is the intercorrelation or the mutual information.

32. The method according to claim 7 wherein the similarity criterion is the intercorrelation or the mutual information.

33. The method according to claim 9 wherein the similarity criterion is the intercorrelation or the mutual information.

34. The method according to claim 11 wherein the similarity criterion is the intercorrelation or the mutual information.

35. The method according to claim 13 wherein the similarity criterion is the intercorrelation or the mutual information.

36. The method according to claim 20 wherein the similarity criterion is the intercorrelation or the mutual information.

37. The method according to claim 28 wherein the similarity criterion is the intercorrelation or the mutual information.

38. The method according to claim 1 wherein the similarity criterion includes the intercorrelation calculated between the pixels in the mobile region displaced by affine transformation in the first mask digital image and the pixels located in the region of interest fixed at its coordinates in the second digital contrast image, among which the pixels corresponding to the information bits of the binary mapping image are set to zero.

39. The method according to claim 2 wherein the similarity criterion includes the intercorrelation calculated between the pixels in the mobile region displaced by affine transformation in the first mask digital image and the pixels located in the region of interest fixed at its coordinates in the second digital contrast image, among which the pixels corresponding to the information bits of the binary mapping image are set to zero.

40. The method according to claim 3 wherein the similarity criterion includes the intercorrelation calculated between the pixels in the mobile region displaced by affine transformation in the first mask digital image and the pixels located in the region of interest fixed at its coordinates in the second digital contrast image, among which the pixels corresponding to the information bits of the binary mapping image are set to zero.

41. The method according to claim 5 wherein the similarity criterion includes the intercorrelation calculated between the pixels in the mobile region displaced by affine transformation in the first mask digital image and the pixels located in the region of interest fixed at its coordinates in the second digital contrast image, among which the pixels corresponding to the information bits of the binary mapping image are set to zero.

42. The method according to claim 7 wherein the similarity criterion includes the intercorrelation calculated between the pixels in the mobile region displaced by affine transformation in the first mask digital image and the pixels located in the region of interest fixed at its coordinates in the second digital contrast image, among which the pixels corresponding to the information bits of the binary mapping image are set to zero.

43. The method according to claim 9 wherein the similarity criterion includes the intercorrelation calculated between the pixels in the mobile region displaced by affine transformation in the first mask digital image and the pixels located in the region of interest fixed at its coordinates in the second digital contrast image, among which the pixels corresponding to the information bits of the binary mapping image are set to zero.

44. The method according to claim 11 wherein the similarity criterion includes the intercorrelation calculated between the pixels in the mobile region displaced by affine transformation in the first mask digital image and the pixels located in the region of interest fixed at its coordinates in the second digital contrast image, among which the pixels corresponding to the information bits of the binary mapping image are set to zero.

45. The method according to claim 13 wherein the similarity criterion includes the intercorrelation calculated between the pixels in the mobile region displaced by affine transformation in the first mask digital image and the pixels located in the region of interest fixed at its coordinates in the second digital contrast image, among which the pixels corresponding to the information bits of the binary mapping image are set to zero.

46. The method according to claim 20 wherein the similarity criterion includes the intercorrelation calculated between the pixels in the mobile region displaced by affine transformation in the first mask digital image and the pixels located in the region of interest fixed at its coordinates in the second digital contrast image, among which the pixels corresponding to the information bits of the binary mapping image are set to zero.

47. The method according to claim 28 wherein the similarity criterion includes the intercorrelation calculated between the pixels in the mobile region displaced by affine transformation in the first mask digital image and the pixels located in the region of interest fixed at its coordinates in the second digital contrast image, among which the pixels corresponding to the information bits of the binary mapping image are set to zero.

48. The method according to claim 28 wherein the similarity criterion includes the intercorrelation calculated between the pixels in the mobile region displaced by affine transformation in the first mask digital image and the pixels located in the region of interest fixed at its coordinates in the second digital contrast image, among which the pixels corresponding to the information bits of the binary mapping image are set to zero.

49. The method according to claim 1 wherein the similarity criterion includes mutual information calculated between the pixels in the mobile region displaced by affine transformation in the first mask digital image and the pixels located in the region of interest fixed at its coordinates in the second digital contrast image, among which the pixels corresponding to the information bits of the binary mapping image are replaced by noise.

50. The method according to claim 2 wherein the similarity criterion includes mutual information calculated between the pixels in the mobile region displaced by affine transformation in the first mask digital image and the pixels located in the region of interest fixed at its coordinates in the second digital contrast image, among which the pixels corresponding to the information bits of the binary mapping image are replaced by noise.

51. The method according to claim 3 wherein the similarity criterion includes mutual information calculated between the pixels in the mobile region displaced by affine transformation in the first mask digital image and the pixels located in the region of interest fixed at its coordinates in the second digital contrast image, among which the pixels corresponding to the information bits of the binary mapping image are replaced by noise.

52. The method according to claim 5 wherein the similarity criterion includes mutual information calculated between the pixels in the mobile region displaced by affine transformation in the first mask digital, image and the pixels located in the region of interest fixed at its coordinates in the second digital contrast image, among which the pixels corresponding to the information bits of the binary mapping image are replaced by noise.

53. The method according to claim 7 wherein the similarity criterion includes mutual information calculated between the pixels in the mobile region displaced by affine transformation in the first mask digital image and the pixels located in the region of interest fixed at its coordinates in the second digital contrast image, among which the pixels corresponding to the information bits of the binary mapping image are replaced by noise.

54. The method according to claim 9 wherein the similarity criterion includes mutual information calculated between the pixels in the mobile region displaced by affine transformation in the first mask digital image and the pixels located in the region of interest fixed at its coordinates in the second digital contrast image, among which the pixels corresponding to the information bits of the binary mapping image are replaced by noise.

55. The method according to claim 11 wherein the similarity criterion includes mutual information calculated between the pixels in the mobile region displaced by affine transformation in the first mask digital image and the pixels located in the region of interest fixed at its coordinates in the second digital contrast image, among which the pixels corresponding to the information bits of the binary mapping image are replaced by noise.

56. The method according to claim 13 wherein the similarity criterion includes mutual information calculated between the pixels in the mobile region displaced by affine transformation in the first mask digital image and the pixels located in the region of interest fixed at its coordinates in the second digital contrast image, among which the pixels corresponding to the information bits of the binary mapping image are replaced by noise.

57. The method according to claim 20 wherein the similarity criterion includes mutual information calculated between the pixels in the mobile region displaced by affine transformation in the first mask digital image and the pixels located in the region of interest fixed at its coordinates in the second digital contrast image, among which the pixels corresponding to the information bits of the binary mapping image are replaced by noise.

58. The method according to claim 28 wherein the similarity criterion includes mutual information calculated between the pixels in the mobile region displaced by affine transformation in the first mask digital image and the pixels located in the region of interest fixed at its coordinates in the second digital contrast image, among which the pixels corresponding to the information bits of the binary mapping image are replaced by noise.

59. The method according to claim 28 wherein the similarity criterion includes mutual information calculated between the pixels in the mobile region displaced by affine transformation in the first mask digital image and the pixels located in the region of interest fixed at its coordinates in the second digital contrast image, among which the pixels corresponding to the information bits of the binary mapping image are replaced by noise.

60. The method according to claim 38 wherein the similarity criterion includes mutual information calculated between the pixels in the mobile region displaced by affine transformation in the first mask digital image and the pixels located in the region of interest fixed at its coordinates in the second digital contrast image, among which the pixels corresponding to the information bits of the binary mapping image are replaced by noise.

61. A radiological apparatus comprising:
means for providing a source of emitted radiation;
means for image acquisition located facing the means for providing a source of emitted radiation;
means for positioning an object between the means for providing a source of emitted radiation and the means for image acquisition; and
means for causing the apparatus to correct an acquired image, the means operatively configured for,
providing a first mask digital image deformed with respect to a sequence of second digital contrast images in which information is represented by pixels with a lower or higher brightness level compared with a background;
detecting the information pixels in the second digital contrast images from which the first mask digital image was subtracted to obtain a binary mapping image, wherein the binary mapping image has information bits at a first determined level that correspond to information pixels of at least one of the second digital contrast images and other information bits at levels that do not correspond to information pixels in the second digital contrast images;
calculating coordinates of a region of interest having dimensions at least partly covering the information bits in the binary mapping image;
searching, for each second digital contrast image, in the first mask digital image for the position of a mobile region, wherein the position of the mobile region maximizes a similarity criterion calculated between the pixels in the region of interest fixed at coordinates in the second digital contrast image and the pixels in the mobile region displaced by shift affine transformation in the first mask digital image;
estimating, for each second digital contrast image, the correction to be made to the first mask digital image compared with each second digital contrast image, wherein the correction is the calculated shift affine transformation that makes the mobile region move from its found position at which the similarity criterion is maximized to the coordinates of the region of interest,
calculating, for each second digital contrast image, a first value and a second value of the similarity criterion; and
obtaining a second corrected image,
wherein the first value is calculated between the pixels located in the region of interest in the first mask digital image transformed by the calculated shift affine transformation and the pixels located in the region of interest in the second digital contrast image,
wherein the second value is calculated between the pixels located outside the region of interest in the first mask digital image transformed by the calculated shift affine transformation and the pixels located outside the region of interest in the second digital contrast image,
wherein, if the first value is greater than or equal to the second value, the first mask digital image transformed by the calculated shift affine transformation is subtracted from the second digital contrast image to obtain the second corrected image, and
wherein, if the first value is less than the second value, the first mask digital image is subtracted from the second digital contrast image to obtain the second corrected image.

62. An article of manufacture for use with a computer system, the article of manufacture comprising a computer readable medium having computer readable program code means embodied in the medium, the program code means implementing the method according to claim 1.

63. A program storage device comprising a medium readable by a computer tangibly embodying a program of instructions executable by the computer to perform the method according to claim 1, the program of instructions embodied in a said medium.

64. The radiological apparatus of claim 61, wherein the similarity criterion is the intercorrelation or the mutual information.

65. The radiological apparatus of claim 64, wherein the intercorrelation is calculated between the pixels in the mobile region displaced by affine transformation in the first mask digital image and the pixels located in the region of interest fixed at its coordinates in the second digital contrast image, among which the pixels corresponding to the information bits of the binary mapping image are set to zero.

66. The radiological apparatus of claim 64, wherein the similarity criterion includes mutual information calculated between the pixels in the mobile region displaced by affine transformation in the first mask digital image and the pixels located in the region of interest fixed at its coordinates in the second digital contrast image, among which the pixels corresponding to the information bits of the binary mapping image are replaced by noise.

67. The radiological apparatus of claim 61, wherein the position of the mobile region has the same dimensions as the region of interest, wherein the position maximizes the similarity criterion in which the similarity criterion is calculated between the pixels in the region of interest fixed at its coordinates in the second digital contrast image and the pixels in the mobile region moved in the first mask digital image, and wherein the estimated correction to be made to the first mask digital image compared with each second digital contrast image is a calculated shift equal to the displacement of the mobile region from its found position maximizing the similarity criterion to the coordinates of the region of interest.

68. The radiological apparatus of claim 67, wherein the means for causing the apparatus to correct an acquired image is further operatively configured for:
   subtracting pixels in the first mask digital image from pixels in the second digital contrast images, to obtain a plurality of third images;
   selecting pixels with the lowest or the highest brightness level among the pixels in the third images, to obtain a fourth contrast mapping image; and
   thresholding of the brightness level of the pixels in the fourth contrast mapping image below or above a threshold value to obtain the binary mapping image.

69. The radiological apparatus of claim 67, wherein the detection of information pixels in the second digital contrast images is executed on the first mask digital image and the second digital contrast images from which a specified collimator model has been subtracted, wherein the specified collimator model has been detected during a previous step to detect the positioning of at least one specified collimator model in the first mask digital image and the second digital contrast images.

70. The radiological apparatus of claim 67, wherein for each second digital contrast image, the calculated shift affine transformation is applied to all pixels in the first mask digital image to obtain a first shifted image, and wherein the first shifted image is subtracted from the second digital contrast image to obtain the second corrected image.

71. The radiological apparatus of claim 67, wherein the lower brightness level threshold is calculated equal to $\mu_g - z.\sigma_g$ where $3 \leq Z \leq 4$, or respectively the upper brightness level threshold is calculated equal to $\mu_g + Z.\sigma_g$ where $3 \leq Z \leq 4$, where $\mu_g$ is the average of the global average contrast distribution (g(x)), and $\sigma_g$ is the standard deviation of the global average contrast distribution (g(x)).

* * * * *

UNITED STATES PATENT AND TRADEMARK OFFICE
CERTIFICATE OF CORRECTION

| | | |
|---|---|---|
| PATENT NO. | : 7,792,346 B2 | Page 1 of 1 |
| APPLICATION NO. | : 11/434839 | |
| DATED | : September 7, 2010 | |
| INVENTOR(S) | : Lienard et al. | |

It is certified that error appears in the above-identified patent and that said Letters Patent is hereby corrected as shown below:

In Column 9, Line 66, delete "YCor=yR-yopt." and insert -- yCor=yR-yopt. --, therefor.

In Column 14, Line 57, in Claim 11, delete "$\mu_{g+Z.\sigma g}$" and insert -- $\mu_g+Z.\sigma_g$ --, therefor.

In Column 14, Line 62, in Claim 12, delete "$\mu_{g-Z.\sigma g}$" and insert -- $\mu_g-Z.\sigma_g$ --, therefor.

In Column 18, Line 34, in Claim 52, delete "digital," and insert -- digital --, therefor.

In Column 20, Line 44, in Claim 63, delete "a" before "said".

In Column 22, Line 15, in Claim 71, "$\mu_{g-Z.\sigma g}$" and insert -- $\mu_g+Z.\sigma_g$ --, therefor.

Signed and Sealed this
Fifteenth Day of March, 2011

David J. Kappos
*Director of the United States Patent and Trademark Office*